United States Patent
Okutani

(10) Patent No.: US 11,150,980 B2
(45) Date of Patent: Oct. 19, 2021

(54) NODE DEVICE, RECOVERY OPERATION CONTROL METHOD, AND NON-TRANSITORY COMPUTER READABLE MEDIUM STORING RECOVERY OPERATION CONTROL PROGRAM

(71) Applicant: NEC Corporation, Tokyo (JP)

(72) Inventor: Nobuyoshi Okutani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/646,199

(22) PCT Filed: May 10, 2018

(86) PCT No.: PCT/JP2018/018027
§ 371 (c)(1),
(2) Date: Mar. 11, 2020

(87) PCT Pub. No.: WO2019/053939
PCT Pub. Date: Mar. 21, 2019

(65) Prior Publication Data
US 2020/0272534 A1 Aug. 27, 2020

(30) Foreign Application Priority Data
Sep. 13, 2017 (JP) .............................. JP2017-175505

(51) Int. Cl.
*G06F 11/00* (2006.01)
*G06F 11/07* (2006.01)

(52) U.S. Cl.
CPC ...... *G06F 11/0793* (2013.01); *G06F 11/0724* (2013.01); *G06F 11/0757* (2013.01)

(58) Field of Classification Search
CPC ............. G06F 11/0793; G06F 11/0724; G06F 11/0757
See application file for complete search history.

(56) References Cited

U.S. PATENT DOCUMENTS

2005/0204214 A1* 9/2005 Welch ................. G06F 11/0709
714/712
2005/0289390 A1 12/2005 Baba

FOREIGN PATENT DOCUMENTS

| JP | H09-152978 A | 6/1997 |
| JP | 2006-011992 A | 1/2006 |
| JP | 2012-014671 A | 1/2012 |

OTHER PUBLICATIONS

International Search Report for PCT Application No. PCT/JP2018/018027, dated Aug. 7, 2018.

* cited by examiner

*Primary Examiner* — Katherine Lin
(74) *Attorney, Agent, or Firm* — Sughrue Mion, PLLC

(57) ABSTRACT

When a node device (10-1) has detected a system failure in a cluster system (1), it determines whether the node device (10-1) is an avoidance-override device. Then, when the node device (10-1) determines that the own node device is an avoidance priority device, the node device (10-1) transmits a request signal to a node device (10-2) other than the node device (10-1). The request signal is a signal for requesting a report about a normal state and an abnormal state of the node device (10-2). Then, the node device (10-1) determines whether to execute a recovery operation of the own node device or to avoid executing a recovery operation of the own node device based on the report from the node device (10-2).

6 Claims, 10 Drawing Sheets

NODE DEVICE, RECOVERY OPERATION CONTROL METHOD, AND NON-TRANSITORY COMPUTER READABLE MEDIUM STORING RECOVERY OPERATION CONTROL PROGRAM

This application is a National Stage Entry of PCT/JP2018/018027 filed on May 10, 2018, which claims priority from Japanese Patent Application 2017-175505 filed on Sep. 13, 2017, the contents of all of which are incorporated herein by reference, in their entirety.

TECHNICAL FIELD

The present invention relates to a node device, a recovery operation control method, and a recovery operation control program.

BACKGROUND ART

In order to continuously provide services, a cluster system (e.g., High Availability (HA) cluster system) having a configuration in which a plurality of node devices (e.g., a plurality of computers) are made to cooperate with each other has been conventionally proposed (e.g., Patent Literature 1). In the cluster system disclosed in Patent Literature 1, when a failure occurs in a certain system in the cluster, a system in the cluster that has detected the failure issues a reset based on the reset delay time in accordance with the priority, in order to prevent all systems from being reset.

CITATION LIST

Patent Literature

Patent Literature 1: Japanese Unexamined Patent Application Publication No. 2006-11992

SUMMARY OF INVENTION

Technical Problem

However, in the cluster system of the aforementioned related art, it is necessary to synchronize the time between a plurality of node devices in the cluster system since a standby system issues a reset to the failed system at a timing based on the reset delay time. Therefore, if the time between a plurality of node devices is not synchronized, all of the plurality of node devices in the cluster system may perform a recovery operation (such as a restart of the application, a failover, and a stopping of nodes) when a failure occurs in the cluster system, thereby causing all the node devices to be stopped.

An object of the present invention is to provide a node device, a recovery operation control method, and a recovery operation control program that can prevent, even when the time between a plurality of node devices in a cluster system is not synchronized, all node devices from being stopped due to a recovery operation.

Solution to Problem

A node device according to a first aspect of the present invention is a node device in a cluster system having a configuration in which a plurality of node devices are made to cooperate with each other, the node device including: a determination unit configured to determine, when the own node device has detected a system failure, whether the own node device is an avoidance-override device configured to make avoidance of a recovery operation a higher priority than execution of a recovery operation; a report request unit configured to transmit, to one or a plurality of other node devices other than the own node device in the cluster system, a request signal for requesting a report about a normal state and an abnormal state of each of the other node devices; and a recovery operation control unit configured to, when the determination unit determines that the own node device is the avoidance-override device, cause the report request unit to transmit the request signal, and determine whether to execute a recovery operation of the own node device or to avoid executing a recovery operation of the own node device based on the report from the one or the plurality of other node devices.

A recovery operation control method according to a second aspect of the present invention is a recovery operation control method performed by a first node device in a cluster system having a configuration in which a plurality of node devices are made to cooperate with each other, the recovery operation control method including: determining, when the first node device has detected a system failure, whether the first node device is an avoidance-override device configured to make avoidance of a recovery operation a higher priority than execution of a recovery operation; transmitting, to one or a plurality of other node devices other than the first node device in the cluster system, a request signal for requesting a report about a normal state and an abnormal state of each of the other node devices when it is determined that the first node device is the avoidance-override device; and determining whether to execute a recovery operation of the first node device or to avoid executing a recovery operation of the first node device based on the report from the one or the plurality of other node devices.

A recovery operation control program according to a third aspect of the present invention is a recovery operation control program for causing a first node device in a cluster system having a configuration in which a plurality of node devices are made to cooperate with each other to execute the following processing of: determining, when the first node device has detected a system failure, whether the first node device is an avoidance-override device configured to make avoidance of a recovery operation a higher priority than execution of a recovery operation; transmitting, to one or a plurality of other node devices other than the first node device in the cluster system, a request signal for requesting a report about a normal state and an abnormal state of each of the other node devices when it is determined that the first node device is the avoidance-override device; and determining whether to execute a recovery operation of the first node device or to avoid executing a recovery operation of the first node device based on the report from the one or the plurality of other node devices.

Advantageous Effects of Invention

According to the present invention, it is possible to provide a node device, a recovery operation control method, and a recovery operation control program that prevent, even when the time between a plurality of node devices in a cluster system is not synchronized, all node devices from being stopped due to a recovery operation.

DESCRIPTION OF EMBODIMENTS

Example embodiments will be described hereinafter with reference to the drawings. Note that the same or equivalent components will be denoted by the same reference symbols throughout the example embodiments, and a duplicate description will be omitted.

First Example Embodiment

<Outline of Cluster System>

Figure 1:
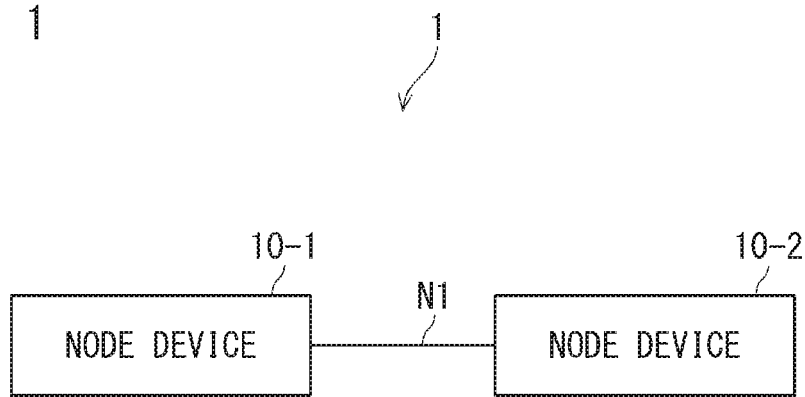
FIG. 1 is a diagram showing an example of a cluster system according to a first example embodiment.

FIG. 1 is a diagram showing an example of a cluster system according to a first example embodiment. In FIG. 1, a cluster system 1 includes a plurality of node devices 10 connected to each other via a communication network N1. The node device 10-1 cooperates with the node device 10-2 in order to continuously provide services. It should be noted that although the cluster system 1 includes two node devices 10-1 and 10-2, the number of node devices 10 included in the cluster system 1 is not limited to two. The node devices 10-1 and 10-2 have the same configuration. In the following description, the node devices 10-1 and 10-2 may be collectively referred to as the node device 10. While one node device 10 among the node devices 10-1 and 10-2 is set as an "avoidance-override device", the other node device 10 is not an avoidance-override device. It is assumed here that the node device 10-1 is set as an "avoidance-override device".

When the node device 10-1 has detected a system failure in the cluster system 1, it determines whether the node device 10-1 is an "avoidance-override device". The "avoidance-override device" is a device that makes avoidance of a recovery operation a higher priority than execution of a recovery operation. It is assumed here that the node device 10-1 is set as an "avoidance-override device" and accordingly the node device 10-1 determines that the own node device is an avoidance-override device. Meanwhile, when the node device 10-2 has detected a system failure in the cluster system 1, the node device 10-2 also determines whether the node device 10-2 is an "avoidance-override device", and determines that the own node device is not an avoidance-override device.

Then, when the node device 10-1 determines that the own node device is an avoidance-override device, it transmits a "request signal" to the node device 10 other than the node device 10-1, that is, the node device 10-2. The "request signal" is a signal for requesting a report about a normal state and an abnormal state of the node device 10-2.

Then, the node device 10-1 determines whether to execute a recovery operation of the own node device or to avoid executing a recovery operation of the own node device based on the report from the node device 10-2.

As described above, in the cluster system 1, when the node device 10-1 has detected a system failure in the cluster system 1, it determines whether the node device 10-1 is an "avoidance-override device". When the node device 10-1 determines that the own node device is an avoidance-override device, the node device 10-1 transmits a "request signal" to the node device 10-2 other than the node device 10-1. Then, the node device 10-1 determines whether to execute a recovery operation of the own node device or to avoid executing a recovery operation of the own node device based on the report from the node device 10-2.

By this configuration of the cluster system 1, the node device 10-1 determines whether to execute a recovery operation of the own node device or to avoid executing a recovery operation of the own node device based on the report from the node device 10-2, and accordingly it is possible to prevent all node devices from being stopped due to a recovery operation. Further, since the node device 10-1 transmits a "request signal" to check the state of the node device 10-2 when the node device 10-1 has detected a system failure in the cluster system 1 and the node device 10-1 is an avoidance-override device, it is possible to prevent all the node devices from being stopped due to a recovery operation even if the time between the node devices is not synchronized.

<Configuration Example of Node Device>

Figure 2:
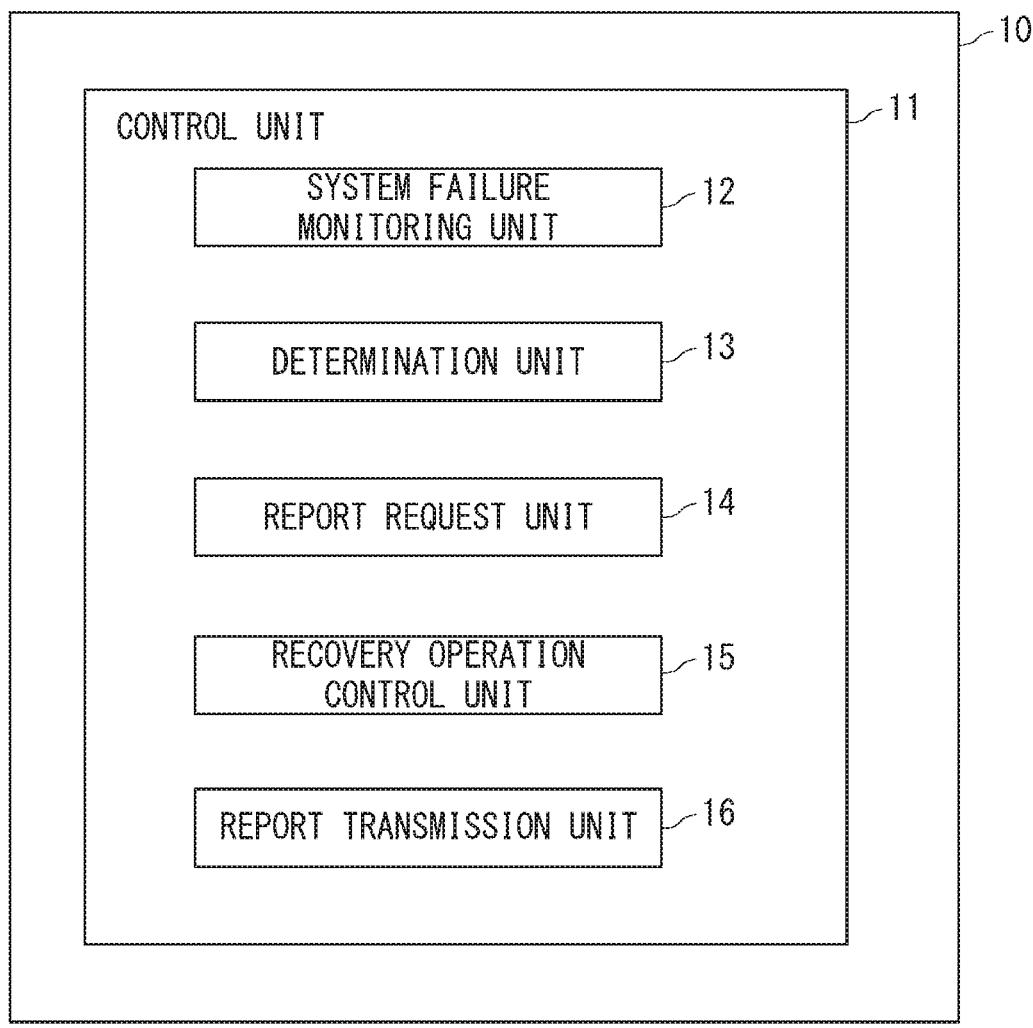
FIG. 2 is a block diagram showing an example of a node device according to the first example embodiment.

FIG. 2 is a block diagram showing an example of the node device according to the first example embodiment. In FIG. 2, the node device 10 includes a control unit 11. The control unit 11 includes a system failure monitoring unit 12, a determination unit 13, a report request unit 14, a recovery operation control unit 15, and a report transmission unit 16.

The system failure monitoring unit 12 monitors a failure (i.e., a system failure) in the own node device 10 and the communication network N1. Note that in this example, for the functional unit (e.g., the system failure monitoring unit 12) of the node device 10-1, the own node device 10 means the node device 10-1, and the other node device 10 means the node device 10-2.

When the system failure monitoring unit 12 has detected a system failure, the determination unit 13 determines whether the own node device 10 is an avoidance-override device that makes avoidance of a recovery operation a higher priority than execution of a recovery operation.

When the determination unit 13 determines that the own node device 10 is an avoidance-override device, the recovery operation control unit 15 causes the report request unit 14 to transmit a request signal to the other node device 10 other than the own node device 10. Then, the recovery operation control unit 15 determines whether to execute a recovery operation of the own node device 10 or to avoid executing a recovery operation of the own node device 10 based on the report from the other node device 10. For example, while the recovery operation control unit 15 determines to execute a recovery operation when the report from the other node device 10 indicates a normal state of the other node device 10, the recovery operation control unit 15 determines to avoid executing a recovery operation when the report from the other node device 10 indicates an abnormal state of the other node device 10.

The report request unit 14 transmits a request signal to the other node device 10 other than the own node device 10 in accordance with the control by the recovery operation control unit 15.

When the report transmission unit 16, of which the own node device 10 is not an avoidance-override device, receives the request signal from the other node device 10 that is an avoidance-override device, the report transmission unit 16 transmits a report to the other node device 10. For example, while the report transmission unit 16 transmits a report indicating that the own node device 10 is in an abnormal state when the system failure monitoring unit 12 has detected a system failure, the report transmission unit 16 transmits a report indicating that the other node device 10 is in a normal state when the system failure monitoring unit 12 has not detected a system failure.

<Operation Example of Node Device>

Figure 3:
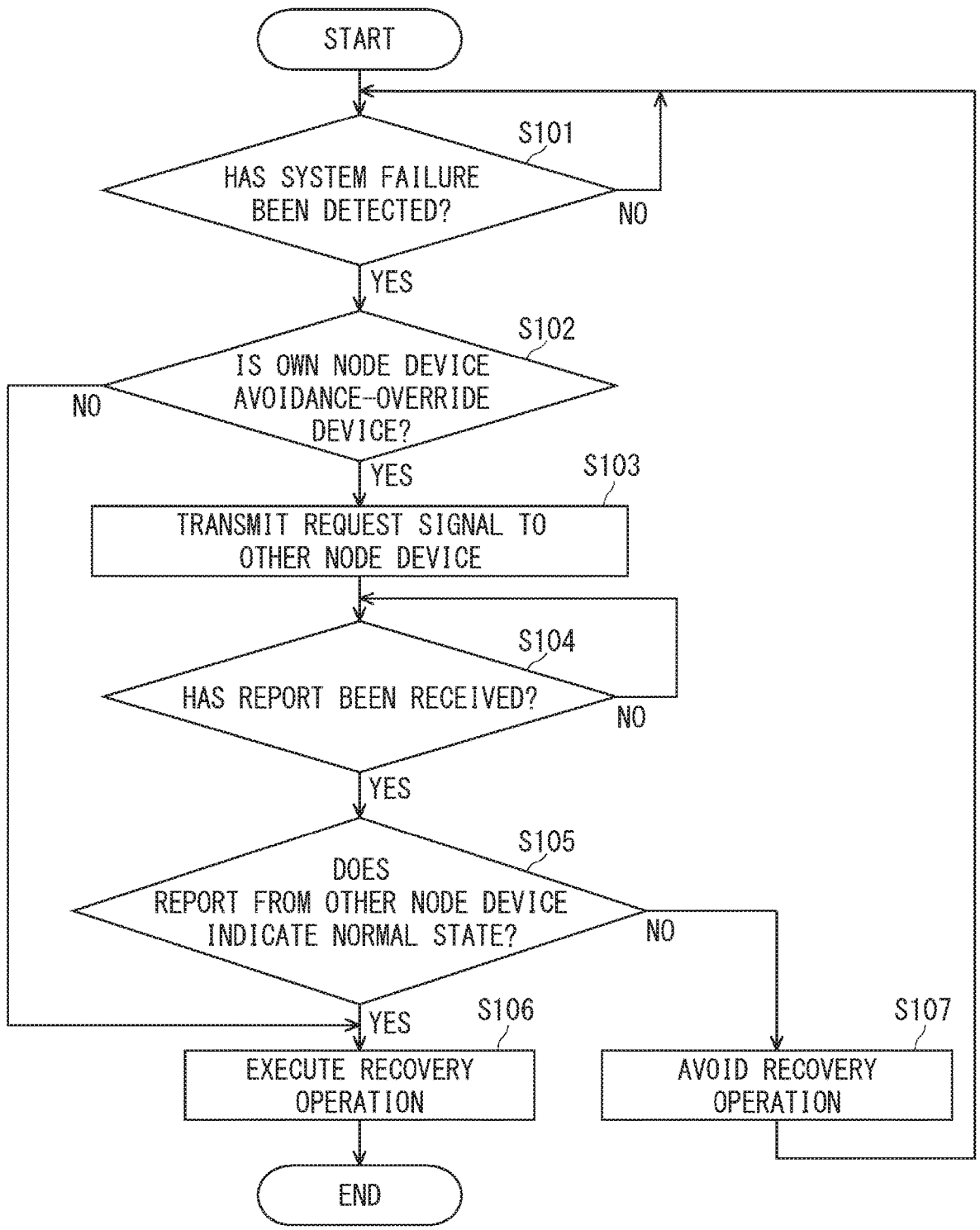
FIG. 3 is a flowchart showing an example of a processing operation of the node device according to the first example embodiment.

An example of a processing operation of the node device 10 having the above-described configuration is described. FIG. 3 is a flowchart showing an example of the processing operation of the node device according to the first example embodiment. The following explanation is made by taking the node device 10-1 as an example.

In the node device 10-1, the system failure monitoring unit 12 repeatedly determines whether it has detected a system failure (NO in Step S101).

When the system failure monitoring unit 12 has detected a system failure (YES in Step S101), the determination unit 13 determines whether the own node device 10 (i.e., the node device 10-1) is an avoidance-override device that makes avoidance of a recovery operation a higher priority than execution of a recovery operation (Step S102).

When the determination unit 13 determines that the own node device 10 (i.e., the node device 10-1) is an avoidance-override device (YES in Step S102), the recovery operation control unit 15 causes the report request unit 14 to transmit a request signal to the other node device 10 (i.e., the node device 10-2) other than the own node device 10 (Step S103).

When the recovery operation control unit 15 waits for a report from the other node device 10 (i.e., the node device 10-2) (NO in Step S104) and receives the report from the other node device 10 (YES in Step S104), the recovery operation control unit 15 determines whether the report from the other node device 10 (i.e., the node device 10-2) indicates a normal state (Step S105).

When the report from the other node device 10 (i.e., the node device 10-2) indicates a normal state (YES in Step S105), the recovery operation control unit 15 determines to execute a recovery operation (Step S106). Then, a recovery operation is executed, the processing flow shown in FIG. 3 ends once, and starts again.

When the report from the other node device 10 (i.e., the node device 10-2) does not indicate a normal state, that is, the report from the other node device 10 indicates an abnormal state (NO in Step S105), the recovery operation control unit 15 determines to avoid executing a recovery operation (Step S107). Then, the processing flow returns to Step S101.

Here, when the determination unit 13 determines that the own node device 10 is not an avoidance-override device (NO in Step S102), the recovery operation control unit 15 does not cause the report request unit 14 to transmit a request signal and determines to execute a recovery operation (Step S106). That is, such processing is executed in the node device 10-2 that is not set as an avoidance-override device. Accordingly, it is possible to satisfy the requirement of the cluster system of reducing the time from when a failure has been detected to when a recovery operation is executed as much as possible.

As described above, according to the first example embodiment, in the node device 10-1, when the system failure monitoring unit 12 has detected a system failure, the determination unit 13 determines whether the node device 10-1 is an avoidance-override device that makes avoidance of a recovery operation a higher priority than execution of a recovery operation. When the determination unit 13 determines that the node device 10-1 is an avoidance-override device, the recovery operation control unit 15 causes the report request unit 14 to transmit a request signal to the node device 10-2 other than the node device 10-1.

By this configuration of the node device 10-1, the node device 10-1 determines whether to execute a recovery operation of the node device 10-1 or to avoid executing a recovery operation of the node device 10-1 based on the report from the node device 10-2, and accordingly it is possible to prevent all node devices 10 from being stopped due to a recovery operation. Further, when the node device 10-1 has detected a system failure in the cluster system 1 and the node device 10-1 is an avoidance-override device, the node device 10-1 transmits a "request signal" to check the state of the node device 10-2, and accordingly it is possible to prevent all the node devices 10-1 and 10-2 from being stopped due to a recovery operation even if the time between the node devices 10-1 and 10-2 is not synchronized. Further, the node device 10-1 transmits a "request signal" to check the state of the node device 10-2, and accordingly it is possible to not only perform live monitoring of the node device 10-2 (i.e., monitoring to determine whether the node device 10-2 is alive or dead) but also check the failure status of the individual resources of the node device 10-2 (i.e., check whether the resources used in the operations are normal or abnormal although the node device 10-2 is alive).

<Modified Example>

<1> The above description has been made on the assumption that the cluster system 1 includes two node devices 10. However, if the cluster system 1 includes three or more node devices 10, the recovery operation control unit 15 can execute the following processing. That is, while the recovery operation control unit 15 controls execution of a recovery operation of the own node device 10 when a report from at least one other node device 10 among a plurality of other node devices 10 indicates a normal state, the recovery operation control unit 15 may avoid executing a recovery operation of the own node device 10 when all reports from the plurality of other node devices 10 indicate an abnormal state. <2>The above description has been made on the assumption that the cluster system 1 includes two node devices 10. However, if the cluster system 1 includes three or more node devices 10, the determination unit 13 can execute the following processing. That is, in a plurality of activated node devices including the own node device 10 in an activated state among a plurality of node devices 10 included in the cluster system 1, when an "avoidance priority" assigned to the own node device 10 is higher than that assigned to any activated node device other than the own node device 10, the determination unit 13 determines that the own node device 10 is an avoidance-override device. For example, when the cluster system 1 includes five node devices 10, avoidance priorities 1 to 5 are set in the five node devices 10, respectively. Then, when, at this point in time, the three node devices 10 having the avoidance priorities 2, 4, and 5, respectively, are in an activated state and the node devices 10 having the avoidance priorities 1 and 3, respectively, are in a stopped state, only the determination unit 13 of the node device 10 having the avoidance priority 2 determines that the own node device 10 is an avoidance-override device.

Second Example Embodiment

<Outline of Cluster System>

Figure 4:
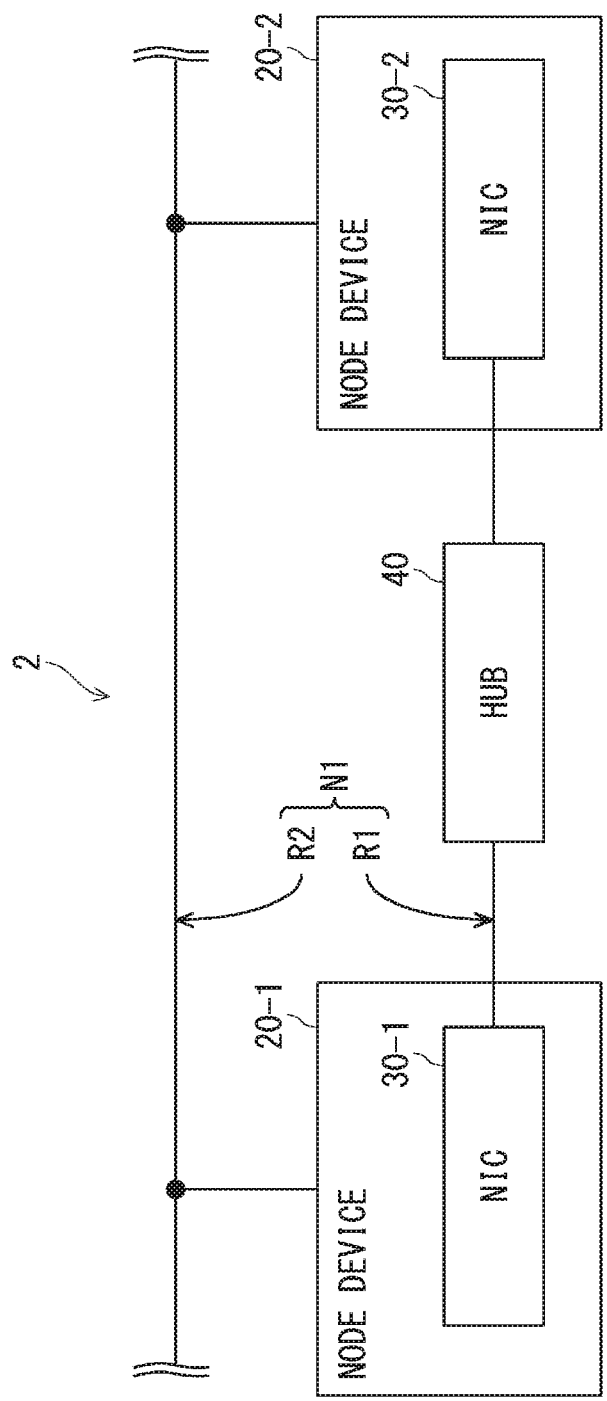
FIG. 4 is a diagram showing an example of a cluster system according to a second example embodiment.

FIG. 4 is a diagram showing an example of a cluster system according to a second example embodiment. In FIG. 4, a cluster system 2 includes node devices 20-1 and 20-2, network interface cards (NICs) 30-1 and 30-2 installed in the node devices 20-1 and 20-2, respectively, and a HUB (network device) 40 that connects the node device 20-1 to the node device 20-2 via the NICs 30-1 and 30-2. The node device 20-1 is connected to the node device 20-2 via the communication network N1 in a manner similar to that in which the node device 10-1 is connected to the node device 10-2 according to the first example embodiment. The communication network N1 according to the second example embodiment includes a first communication route R1 and a second communication route R2. In FIG. 4, the route including the NIC 30-1, the HUB 40, and the NIC 30-2 is the first communication route R1.

The node devices 20-1 and 20-2 have the same configuration. In the following description, the node devices 20-1 and 20-2 may be collectively referred to as the node device 20. While one node device 20 among the node devices 20-1 and 20-2 is set as an "avoidance-override device", the other node device 20 is not an avoidance-override device. It is assumed here that the node device 20-1 is set as an "avoidance-override device".

<Configuration Example of Node Device>

Figure 5:
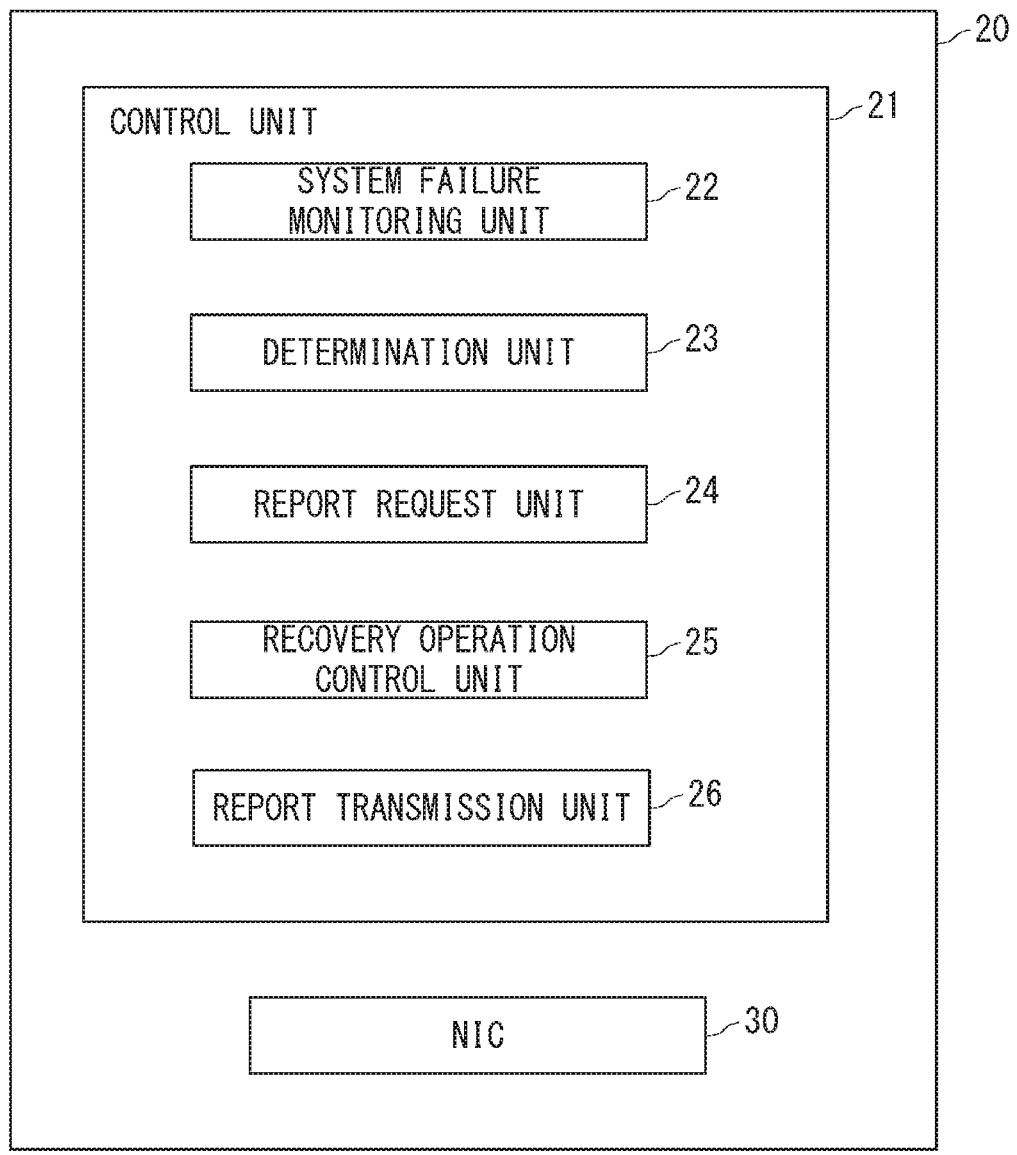
FIG. 5 is a block diagram showing an example of a node device according to the second example embodiment.

FIG. 5 is a block diagram showing an example of the node device according to the second example embodiment. In FIG. 5, the node device 20 includes a control unit 21. The control unit 21 includes a system failure monitoring unit 22, a determination unit 23, a report request unit 24, a recovery operation control unit 25, and a report transmission unit 26.

Like the system failure monitoring unit 12 according to the first example embodiment, the system failure monitoring unit 22 monitors a failure (i.e., a system failure) in the own node device 20 and the communication network N1. Note that in this example, for the functional unit (e.g., the system failure monitoring unit 22) of the node device 20-1, the own node device 20 means the node device 20-1, and the other node device 20 means the node device 20-2.

The system failure monitoring unit 22 monitors, for example, a failure of the NIC 30 installed in the own node device 20 and a failure of the HUB 40, that is, a failure of the first communication route R1. Examples of a failure of the first communication route R1 include a disconnection of a LAN cable connected to the NIC 30 and a failure of the HUB 40, and in either case, the system failure monitoring unit 22 detects it as a disconnection of the link of the NIC 30.

Here, when a failure occurs in the NIC 30-1 installed in the node device 20-1, the system failure monitoring unit 22 of the node device 20-1 detects a failure while the system failure monitoring unit 22 of the node device 20-2 does not detect a failure. Accordingly, when a failure occurs in the NIC 30-1, the node device 20-2 does not execute a recovery operation, and accordingly none of the node devices 20 in the cluster system 2 are stopped. On the other hand, when a failure occurs in the HUB 40, the system failure monitoring unit 22 of the node device 20-1 and the system failure monitoring unit 22 of the node device 20-2 both detect a failure. Accordingly, if the node devices 20-1 and 20-2 both execute a recovery operation, a problem occurs.

When the system failure monitoring unit 22 has detected a failure in the first communication route R1, the determination unit 23 determines whether the own node device 20 is an avoidance-override device that makes avoidance of a recovery operation a higher priority than execution of a recovery operation.

When the determination unit 23 determines that the own node device 20 is an avoidance-override device, the recovery operation control unit 25 causes the report request unit 24 to transmit a request signal to the other node device 20 other than the own node device 20 via the second communication route R2. Then, the recovery operation control unit 25 determines whether to execute a recovery operation of the own node device 20 or to avoid executing a recovery operation of the own node device 20 based on the report from the other node device 20.

The report request unit 24 transmits a request signal to the other node device 20 other than the own node device 20 via the second communication route R2 in accordance with the control by the recovery operation control unit 25.

When the report transmission unit 26, of which the own node device 20 is not an avoidance-override device, receives the request signal via the second communication route R2 from the other node device 20 that is an avoidance-override device, the report transmission unit 26 transmits a report to the other node device 20 via the second communication route R2.

As described above, according to the second example embodiment, in the node device 20-1, when a failure of the first communication route R1 has been detected, the determination unit 23 determines whether the node device 20-1 is an avoidance-override device that makes avoidance of a recovery operation a higher priority than execution of a recovery operation. Then, when the determination unit 23 determines that the node device 20-1 is an avoidance-override device, the recovery operation control unit 25 causes the report request unit 24 to transmit a request signal to the node device 20-2 via the second communication route R2. Then, the recovery operation control unit 25 determines whether to execute a recovery operation of the node device 20-1 or to avoid executing a recovery operation of the node device 20-1 based on the report from the node device 20-2.

By this configuration of the node device 20-1, it is possible to prevent both of the node devices 20-1 and 20-2 from being stopped due to a recovery operation even when a failure of the first communication route R1 detected by both of the node devices 20-1 and 20-2 occurs.

Third Example Embodiment

<Outline of Cluster System>

Figure 6:
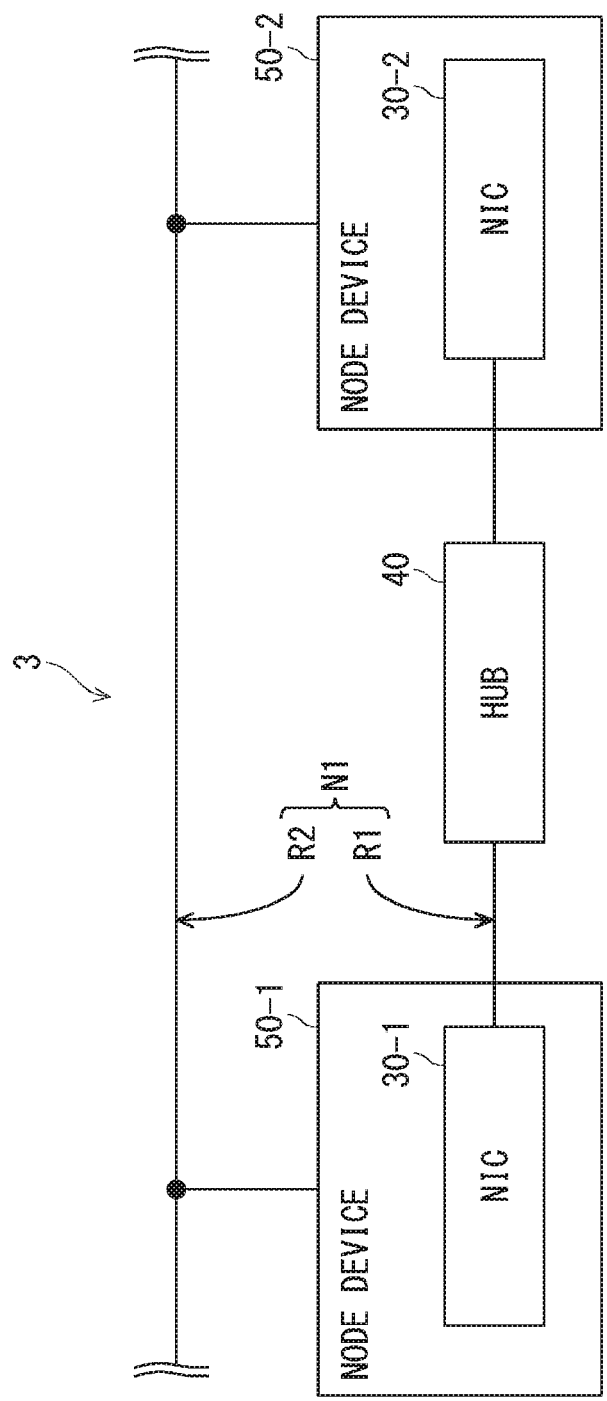
FIG. 6 is a diagram showing an example of a cluster system according to a third example embodiment.

FIG. 6 is a diagram showing an example of a cluster system according to a third example embodiment. In FIG. 6, a cluster system 3 includes node devices 50-1 and 50-2, the network interface cards (NICs) 30-1 and 30-2 installed in the node devices 50-1 and 50-2, respectively, and the HUB (network device) 40 that connects the node device 50-1 to the node device 50-2 via the NICs 30-1 and 30-2. The node device 50-1 is connected to the node device 50-2 via the communication network N1 in a manner similar to that in which the node devices 20-1 is connected to the node device 20-2 according to the second example embodiment.

The node devices 50-1 and 50-2 have the same configuration. In the following description, the node devices 50-1 and 50-2 may be collectively referred to as the node device 50. While one node device 50 among the node devices 50-1 and 50-2 is set as an "avoidance-override device", the other node device 50 is not an avoidance-override device. It is assumed here that the node device 50-1 is set as an "avoidance-override device".

<Configuration Example of Node Device>

Figure 7:
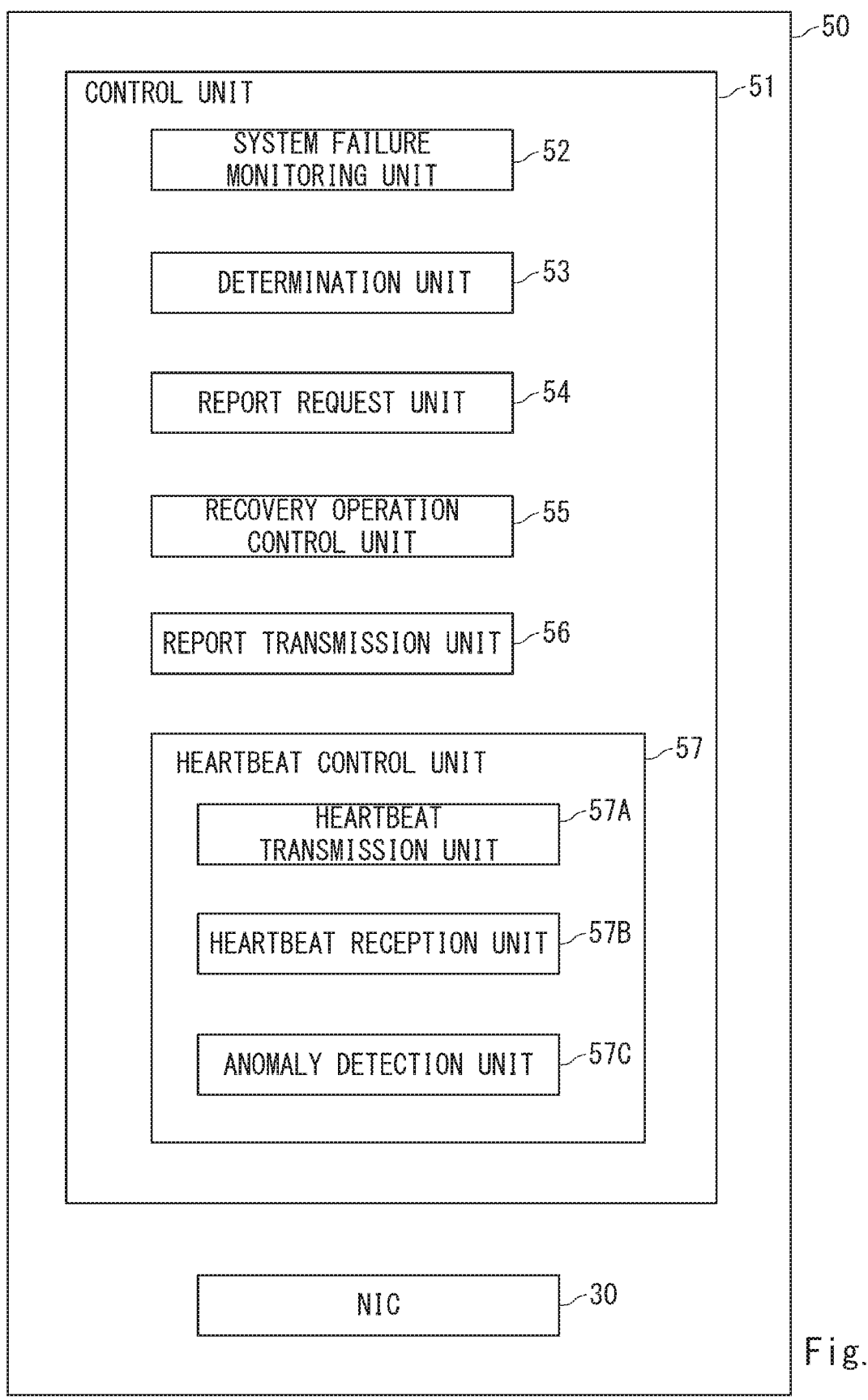
FIG. 7 is a block diagram showing an example of a node device according to the third example embodiment.

FIG. 7 is a block diagram showing an example of a node device according to the third example embodiment. In FIG. 7, the node device 50 includes a control unit 51. The control unit 51 includes a system failure monitoring unit 52, a determination unit 53, a report request unit 54, a recovery operation control unit 55, a report transmission unit 56, and a heartbeat control unit 57. The heartbeat control unit 57 includes a heartbeat transmission unit 57A, a heartbeat reception unit 57B, and an anomaly detection unit 57C.

Like the system failure monitoring unit 22 according to the second example embodiment, the system failure monitoring unit 52 monitors a failure (i.e., a system failure) in the own node device 50 and the communication network N1. The system failure monitoring unit 52 monitors, for example, a failure of the NIC 30 installed in the own node device 50 and a failure of the HUB 40, that is, a failure of the first communication route R1. In this example, for the functional unit (e.g., the system failure monitoring unit 52) of the node device 50-1, the own node device 50 means the node device 50-1, and the other node device 50 means the node device 50-2.

Like the determination unit 23 according to the second example embodiment, when the system failure monitoring unit 52 has detected, for example, a failure of the first communication route R1, the determination unit 53 determines whether the own node device 50 is an avoidance-override device that makes avoidance of a recovery operation a higher priority than execution of a recovery operation.

The heartbeat transmission unit 57A transmits a heartbeat signal at a predetermined cycle via each of the first and the second communication routes R1 and R2.

The heartbeat reception unit 57B receives the heartbeat signal transmitted from the other node device 50 via the first and the second communication routes R1 and R2.

When the anomaly detection unit 57C does not receive the heartbeat signal from the other node device 50 at a predetermined cycle, the anomaly detection unit 57C detects that the other node device 50 is abnormal. On the other hand, when the anomaly detection unit 57C receives the heartbeat signal from the other node device 50 at a predetermined cycle, the anomaly detection unit 57C detects that the other node device 50 is normal.

When the determination unit 53 determines that the own node device 50 is an avoidance-override device and the anomaly detection unit 57C detects that the other node device 50 is normal, the recovery operation control unit 55 causes the report request unit 54 to transmit a request signal to the other node device 50 via the second communication route R2. Then, the recovery operation control unit 55 determines whether to execute a recovery operation of the own node device 50 or to avoid executing a recovery operation of the own node device 50 based on the report from the other node device 50.

Further, when the determination unit 53 determines that the own node device 50 is an avoidance-override device and the anomaly detection unit 57C detects that the other node device 50 is abnormal, the recovery operation control unit 55 does not cause the report request unit 54 to transmit a request signal and determines to avoid executing a recovery operation of the own node device 50. Thus, it is possible to satisfy the requirement of the cluster system of reducing the processing load of the control part 51 as much as possible. Further, as the recovery operation control unit 55 does not cause the report request unit 54 to transmit a request signal and determines to avoid executing a recovery operation of the node device 50, the determination can be made without delay.

The report request unit 54 transmits a request signal to the other node device 50 other than the own node device 50 via the second communication route R2 in accordance with the control by the recovery operation control unit 55.

When the report transmission unit 56, of which the own node device 50 is not an avoidance-override device, receives the request signal via the second communication route R2 from the other node device 50 that is an avoidance-override device, the report transmission unit 56 transmits a report to the other node device 50 via the second communication route R2.

<Operation Example of Node Device>

Figure 8:
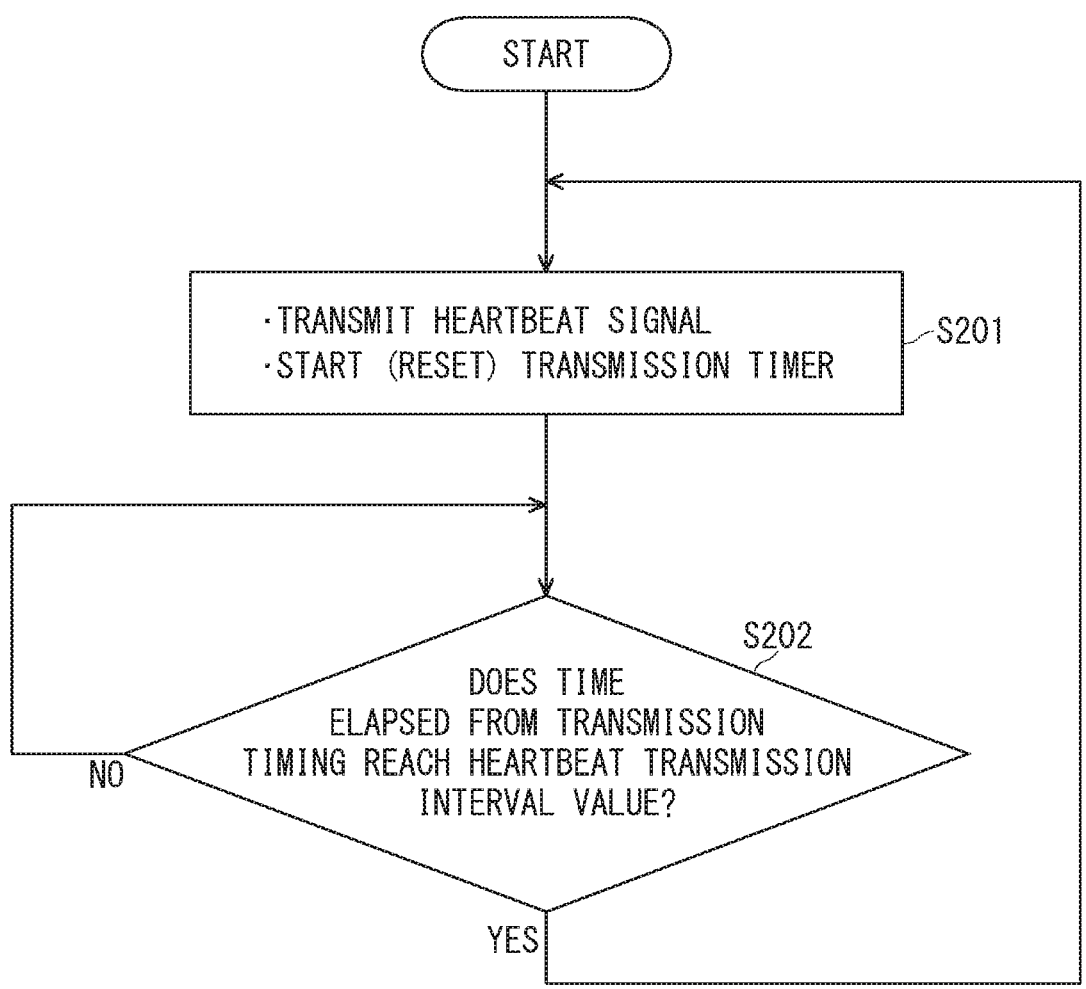
FIG. 8 is a flowchart showing an example of heartbeat transmission processing of the node device according to the third example embodiment.
Figure 9:
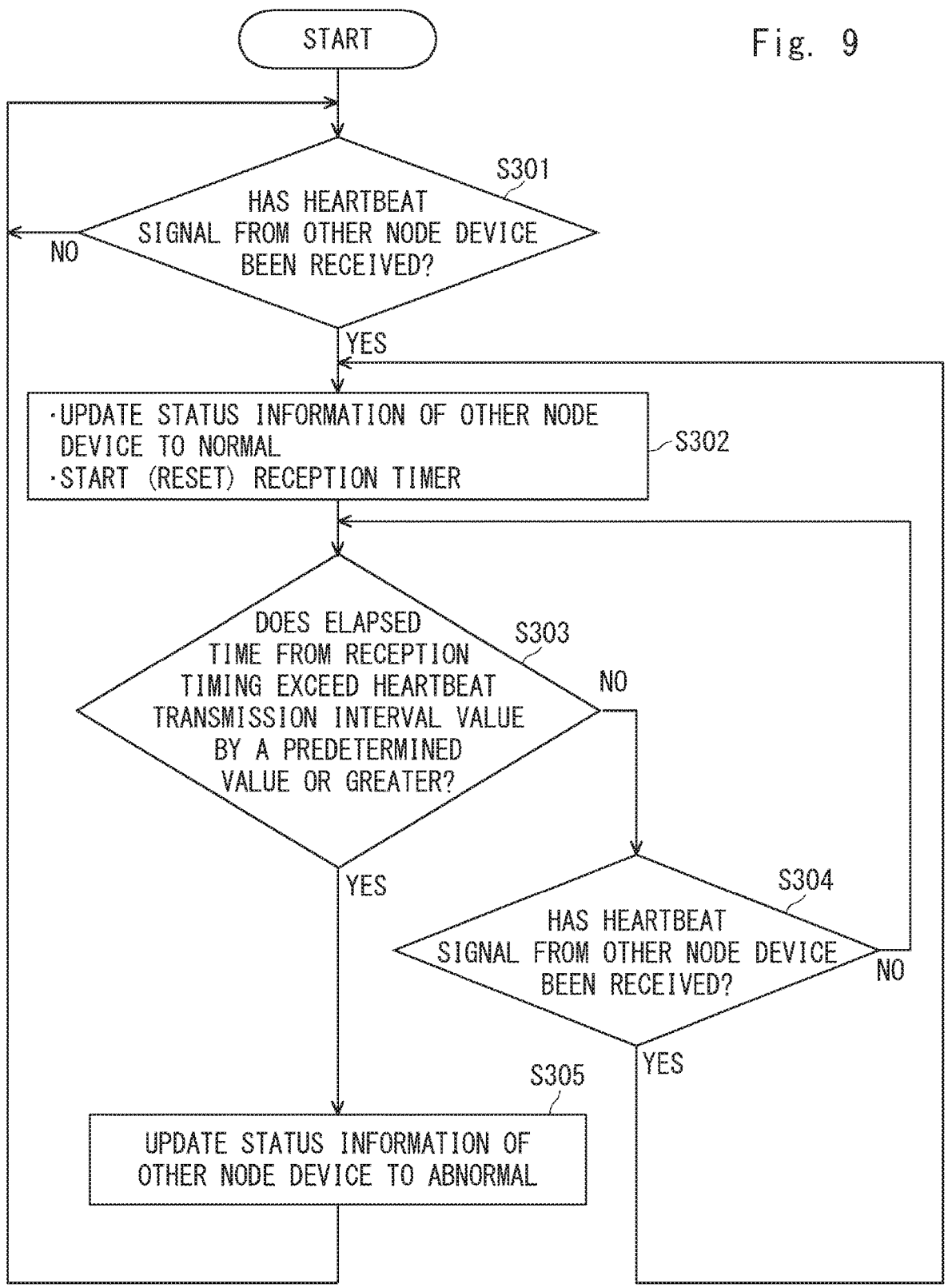
FIG. 9 is a flowchart showing an example of anomaly detection processing of the node device according to the third example embodiment.
Figure 10:
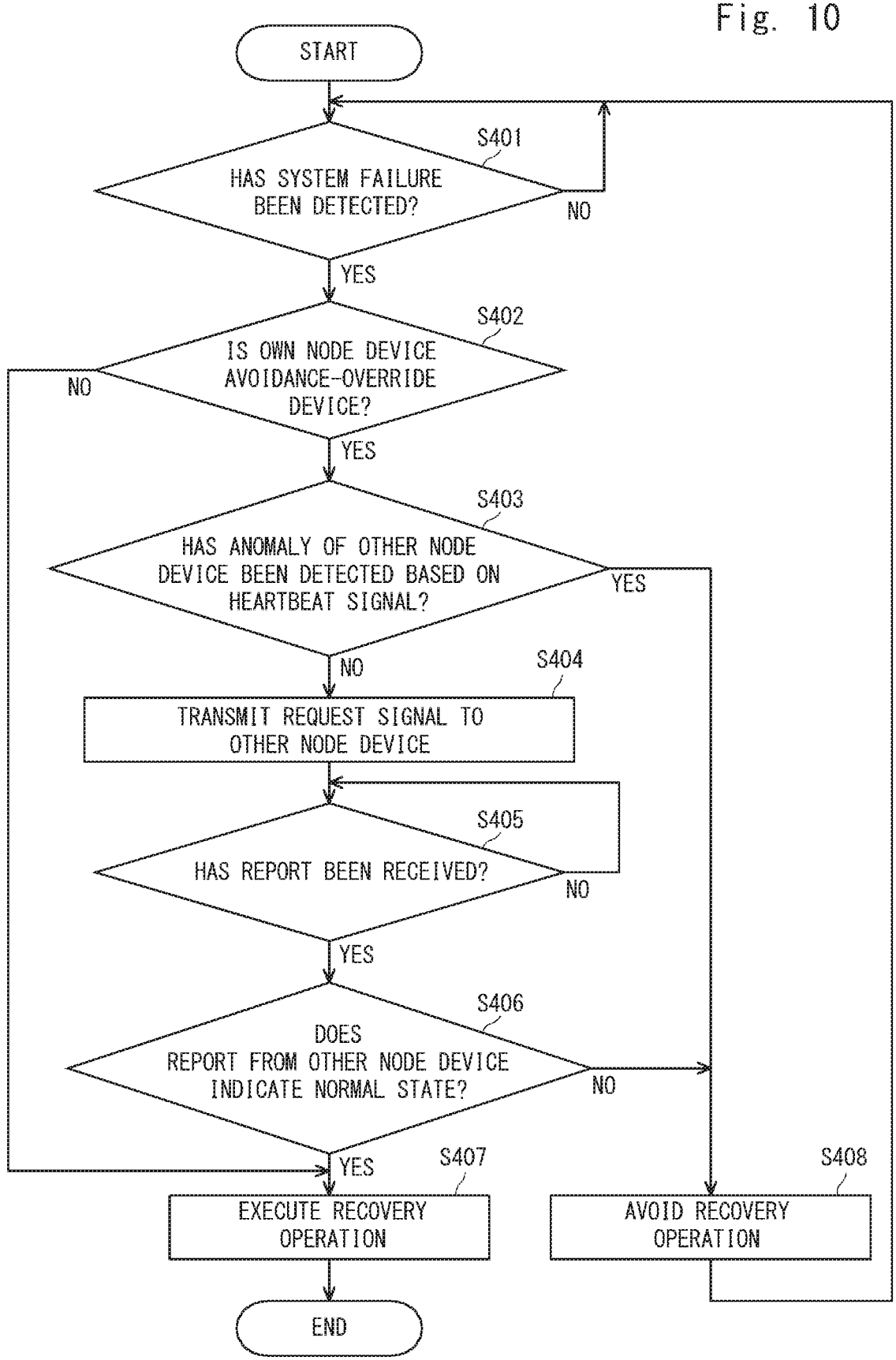
FIG. 10 is a flowchart showing an example of control processing for a recovery operation of the node device according to the third example embodiment.

An example of a processing operation of the node device 50 having the above-described configuration is described. FIGS. 8 to 10 are flowcharts showing an example of control processing for a recovery operation of the node device according to the third example embodiment.

<Heartbeat Transmission Processing>

FIG. 8 is a flowchart showing an example of heartbeat transmission processing of the node device according to the third example embodiment.

The heartbeat transmission unit 57A transmits a heartbeat signal via each of the first and the second communication routes R1 and R2, and starts a transmission timer (not shown) included in the heartbeat transmission unit 57A (Step S201).

The heartbeat transmission unit 57A waits until the time elapsed from a transmission timing of the heartbeat signal reaches a heartbeat transmission interval value (NO in Step S202).

Then, when the elapsed time reaches the heartbeat transmission interval value (YES in Step S202), the processing step returns to Step S201. That is, the heartbeat transmission unit 57A transmits a heartbeat signal via each of the first and the second communication routes R1 and R2, and resets the transmission timer (not shown) included in heartbeat transmission unit 57A.

As described above, the heartbeat transmission unit 57A transmits a heartbeat signal at a predetermined cycle via each of the first and the second communication routes R1 and R2.

<Anomaly Detection Processing of Other Node Devices>

FIG. 9 is a flowchart showing an example of anomaly detection processing of the node device according to the third example embodiment. This anomaly detection processing is performed in parallel with the aforementioned heartbeat transmission processing.

The anomaly detection unit 57C waits until it receives a heartbeat signal from the other node device 50 (NO in Step S301).

When the anomaly detection unit 57C receives the heartbeat signal from the other node device 50 (YES in Step S301), the anomaly detection unit 57C updates the status information of the other node device 50 to "normal", and starts a reception timer (not shown) included in the anomaly detection unit 57C (Step S302).

Next, the anomaly detection unit 57C determines whether the time elapsed from a reception timing has exceeded the heartbeat transmission interval value by a predetermined value or greater (Step S303). Note that the predetermined value is zero or a positive value.

If the elapsed time does not exceed the heartbeat transmission interval value by a predetermined value or greater (NO in Step S303), the anomaly detection unit 57C determines whether it has received a heartbeat signal from the other node device 50 (Step S304).

When the anomaly detection unit 57C has not received the heartbeat signal from the other node device 50 (NO in Step S304), the processing step returns to Step S303.

When the anomaly detection unit 57C has received the heartbeat signal from the other node device 50 (YES in Step S304), the processing step returns to Step S302.

That is, the anomaly detection unit 57C waits to receive the heartbeat signal from the other node device 50 until the time elapsed from the reception timing exceeds the heartbeat transmission interval value by a predetermined value or greater (NO in Step S303 and NO in Step S304). Then, when the anomaly detection unit 57C receives the heartbeat signal from the other node device 50 before the elapsed time exceeds the heartbeat transmission interval value by a predetermined value or greater (NO in Step S303 and YES in Step S304), the anomaly detection unit 57C updates the status information of the other node device 50 to "normal" and resets the reception timer (not shown) (Step S302).

When the elapsed time exceeds the heartbeat transmission interval value by a predetermined value or greater without the anomaly detection unit 57C receiving the heartbeat signal from the other node device 50 before the elapsed time exceeds the heartbeat transmission interval value by a predetermined value or greater (YES in Step S303), the anomaly detection unit 57C updates the status information of the other node device 50 to "abnormal" (Step S305). Then, the processing step returns to Step S301.

<Control Processing for Recovery Operation>

FIG. 10 is a flowchart showing an example of control processing for a recovery operation of the node device according to the third example embodiment. This control processing for a recovery operation is performed in parallel with the aforementioned anomaly detection processing of the other node device.

The processing operations in Steps S401 and S402 are the same as those in Steps S101 and S102 shown in FIG. 3.

When the determination unit 53 determines that the own node device 50 is an avoidance-override device (YES in Step S402), the recovery operation control unit 55 determines whether an anomaly of the other node device 50 has been detected based on the heartbeat signal (Step S403). That is, the recovery operation control unit 55 refers to the status information updated in the anomaly detection processing shown in FIG. 9 and determines whether the other node device 50 is abnormal.

When an anomaly of the other node device 50 has not been detected based on the heartbeat signal (NO in Step S403), the recovery operation control unit 55 causes the report request unit 54 to transmit a request signal to the other node device 50 other than the own node device 50 (Step S404). The processing operations in Steps S404 to S408 are the same as those in Steps S103 to S107 shown in FIG. 3.

On the other hand, when an anomaly of the other node device 50 has been detected based on the heartbeat signal (YES in Step S403), the recovery operation control unit 55 does not cause the report request unit 54 to transmit a request signal and determines to avoid executing a recovery operation of the own node device 50 (Step S408).

As described above, according to the third example embodiment, in the node device 50-1, when the determination unit 53 determines that the node device 50-1 is an avoidance-override device and the anomaly detection unit 57C has detected an anomaly of the node device 50-2, the recovery operation control unit 55 does not cause the report request unit 54 to transmit a request signal and determines to avoid executing a recovery operation of the node device 50-1.

The above-described node device 50-1 enables the requirement of the cluster system of reducing the processing load of the control part 51 as much as possible to be satisfied.

<Other Example Embodiments>

Figure 11:
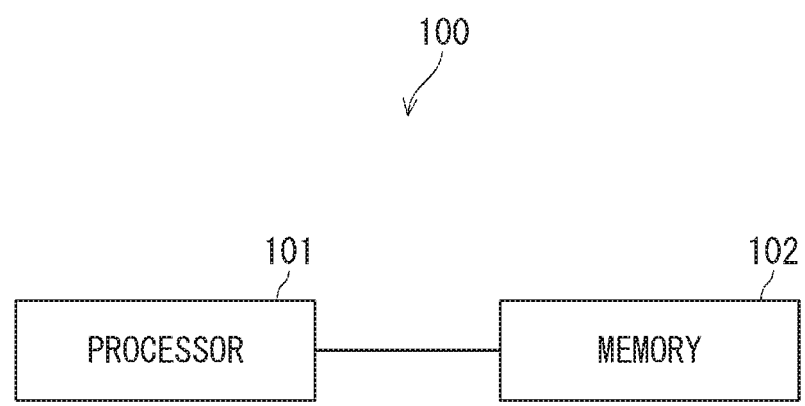
FIG. 11 is a diagram showing an example of a hardware configuration of the node device.

FIG. 11 is a diagram showing an example of a hardware configuration of the node device. In FIG. 11, a node device 100 includes a processor 101 and a memory 102. The control units 11, 21, and 51 of the node devices 10, 20, and 50 according to the first to the third example embodiments, respectively, are implemented by the processor 101 loading and executing a program stored in the memory 102. Further, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While the present invention has been described with reference to the example embodiments, the present invention is not limited to the aforementioned example embodiments. Various changes that can be understood by those skilled in the art can be made to the configurations and the details of the present invention within the scope of the present invention.

This application is based upon and claims the benefit of priority from Japanese Patent Application No. 2017-175505, filed on Sep. 13, 2017, the disclosure of which is incorporated herein in its entirety by reference.

REFERENCE SIGNS LIST 1, 2, 3 CLUSTER SYSTEM
10, 20, 50 NODE DEVICE
11, 21, 51 CONTROL UNIT
12, 22, 52 SYSTEM FAILURE MONITORING UNIT
13, 23, 53 DETERMINATION UNIT
14, 24, 54 REPORT REQUEST UNIT
15, 25, 55 RECOVERY OPERATION CONTROL UNIT
16, 26, 56 REPORT TRANSMISSION UNIT
57 HEARTBEAT CONTROL UNIT
57A HEARTBEAT TRANSMISSION UNIT
57B HEARTBEAT RECEPTION UNIT
57C ANOMALY DETECTION UNIT

What is claimed is:

1. A node device in a cluster system having a configuration in which a plurality of node devices are made to cooperate with each other, the node device comprising:
hardware, including a processor and a memory;
determination unit that is implemented at least by the hardware and configured to determine, when the node device has detected a system failure, whether the node device is an avoidance-override device configured to make avoidance of a recovery operation a higher priority than execution of a recovery operation;
report request unit that is implemented at least by the hardware and configured to transmit, to one or a plurality of other node devices other than the node device in the cluster system, a request signal for requesting a report about a normal state and an abnormal state of each of the other node devices; and
recovery operation control unit that is implemented at least by the hardware and configured to, when the determination unit determines that the node device is the avoidance-override device, cause the report request unit to transmit the request signal and determining whether to execute a recovery operation of the node device or to avoid executing a recovery operation of the node device based on the report from the one or the plurality of other node devices,
wherein the recovery operation control unit executes the recovery operation of the node device based on a determination that the report from at least one of the one or the plurality of other node devices indicates a normal state, and the recovery operation control unit avoids executing the recovery operation based on a determination that all reports from the one or the plurality of other node devices indicate an abnormal state.

2. The node device according to claim 1, wherein
when the plurality of node devices are a first node device and a second node device connected to each other via a first communication route and a second communication route and the node device is the first node device,
the determination unit determines, when the first node device has detected a communication failure of the first communication route as the system failure, whether the first node device is the avoidance-override device, and
the recovery operation control unit, when the determination unit determines that the first node device is the avoidance-override device, causes the report request unit to transmit the request signal to the second node device via the second communication route and determines whether to execute a recovery operation of the first node device or to avoid executing a recovery operation of the first node device based on the report from the second node device.

3. The node device according to claim 2, further comprising detection unit that is implemented at least by the hardware and configured to detect whether the second node device is normal or abnormal based on a heartbeat signal transmitted from the second node device via each of the first and the second communication routes, wherein
when the determination unit determines that the first node device is the avoidance-override device and the detection unit has detected that the second node device is normal, the recovery operation control unit causes the report request unit to transmit the request signal to the second node device via the second communication route and determines whether to execute a recovery operation of the first node device or to avoid executing a recovery operation of the first node device based on the report from the second node device, and
when the determination unit determines that the first node device is the avoidance-override device and the detection unit has detected that the second node device is abnormal, the recovery operation control unit does not cause the report request unit to transmit the request signal and determines to avoid executing a recovery operation of the first node device.

4. The node device according to claim 1, wherein in a plurality of activated node devices including the node device in an activated state among the plurality of node devices, the determination unit determines that the node device is the avoidance-override device when an avoidance priority assigned to the node device is higher than that assigned to any activated node device other than the node device.

5. A recovery operation control method performed by a first node device in a cluster system having a configuration in which a plurality of node devices are made to cooperate with each other, the recovery operation control method comprising:
determining, when the first node device has detected a system failure, whether the first node device is an avoidance-override device configured to make avoidance of a recovery operation a higher priority than execution of a recovery operation;
transmitting, to one or a plurality of other node devices other than the first node device in the cluster system, a request signal for requesting a report about a normal state and an abnormal state of each of the other node devices when it is determined that the first node device is the avoidance-override device;
determining whether to execute a recovery operation of the first node device or to avoid executing a recovery operation of the first node device based on the report from the one or the plurality of other node device; and
executing the recovery operation of the first node device based on a determination that the report from at least one the one or the plurality of other node devices indicates a normal state, and avoiding executing the recovery operation based on a determination that all reports from the one or the plurality of other node devices indicate an abnormal state.

6. A non-transitory computer readable medium storing a recovery operation control program for causing a first node device in a cluster system having a configuration in which a plurality of node devices are made to cooperate with each other to execute the following processing of:
determining, when the first node device has detected a system failure, whether the first node device is an avoidance-override device configured to make avoidance of a recovery operation a higher priority than execution of a recovery operation;
transmitting, to one or a plurality of other node devices other than the first node device in the cluster system, a request signal for requesting a report about a normal state and an abnormal state of each of the other node devices when it is determined that the first node device is the avoidance-override device;
determining whether to execute a recovery operation of the first node device or to avoid executing a recovery operation of the first node device based on the report from the one or the plurality of other node devices; and
executing the recovery operation of the first node device based on a determination that the report from at least one the one or the plurality of other node devices indicates a normal state, and avoiding executing the recovery operation based on a determination that all reports from the one or the plurality of other node devices indicate an abnormal state.

* * * * *